No. 701,301. Patented June 3, 1902.
C. F. CRAVER.
HARVESTER ATTACHMENT.
(Application filed May 4, 1900.)
(No Model.) 2 Sheets—Sheet 1.
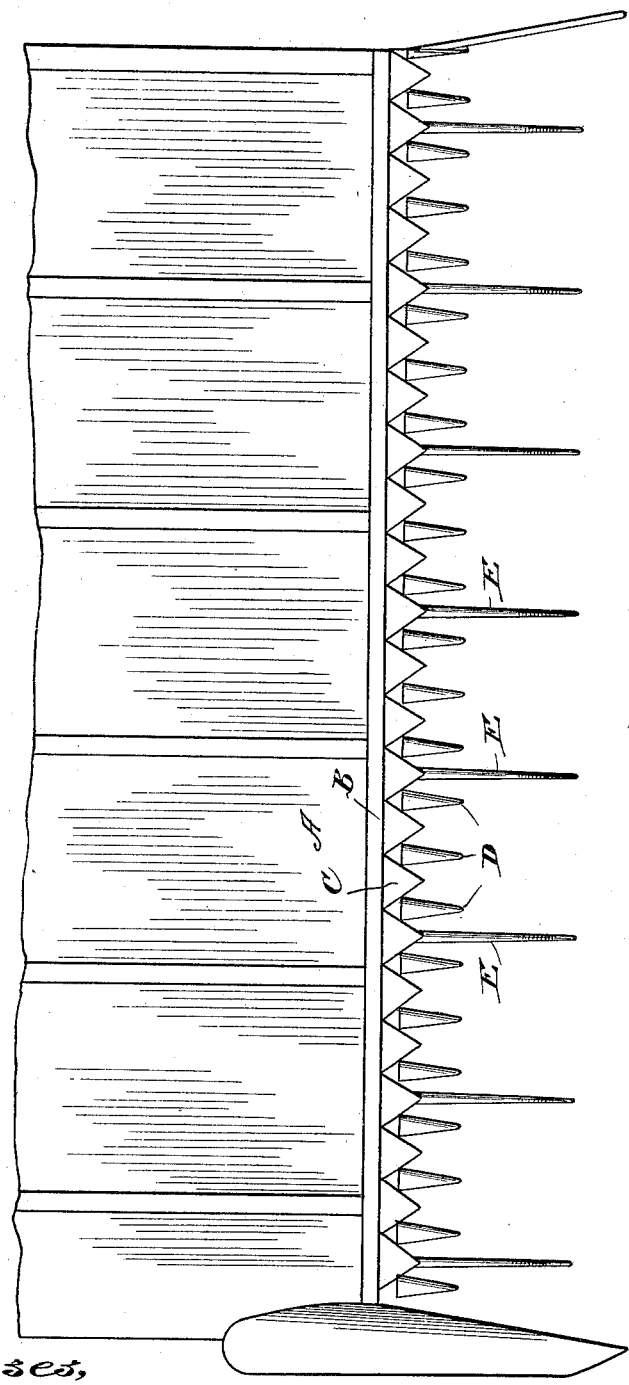

No. 701,301. Patented June 3, 1902.
C. F. CRAVER.
HARVESTER ATTACHMENT.
(Application filed May 4, 1900.)
(No Model.) 2 Sheets—Sheet 2.
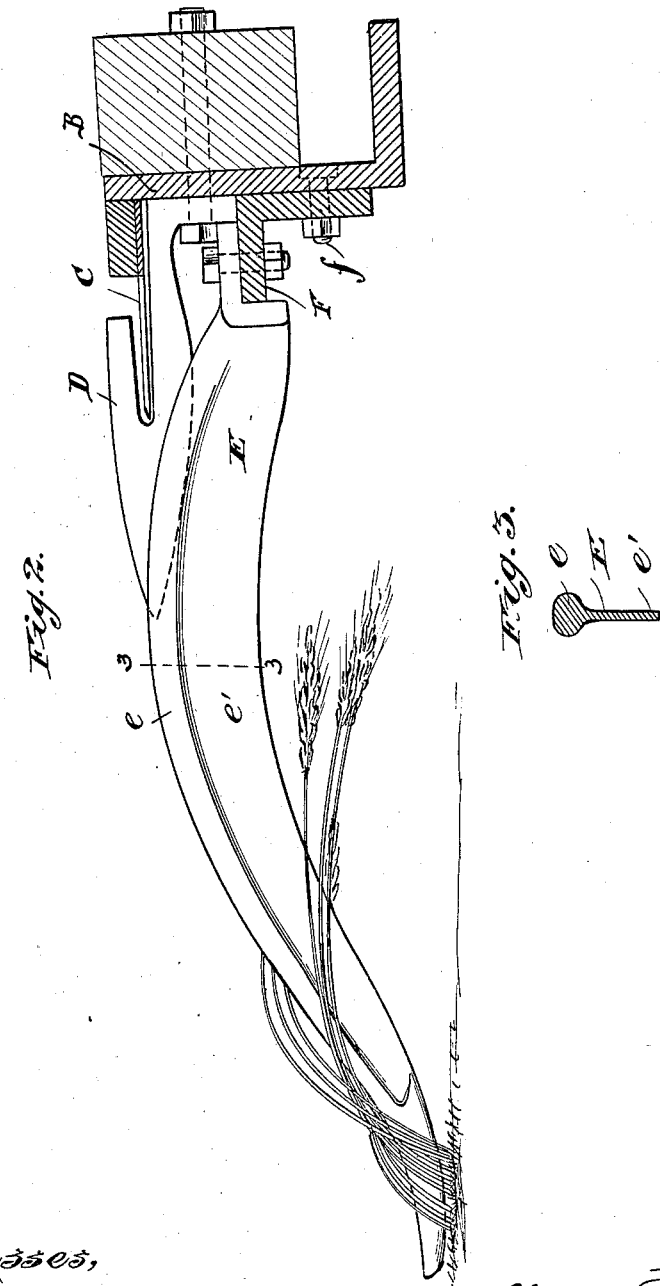

UNITED STATES PATENT OFFICE.

CHARLES F. CRAVER, OF HARVEY, ILLINOIS.

HARVESTER ATTACHMENT.

SPECIFICATION forming part of Letters Patent No. 701,301, dated June 3, 1902.

Application filed May 4, 1900. Serial No. 15,452. (No model.)

*To all whom it may concern:*

Be it known that I, CHARLES F. CRAVER, of Harvey, in the county of Cook and State of Illinois, have invented certain new and useful Improvements in Harvester Attachments, of which the following is a specification.

This invention relates to an attachment for harvesters designed to enable fallen or lodged grain to be saved; and it consists in a device auxiliary or supplementary to the harvester mechanism and intended to be attached to the finger-bar or front of the platform for the purpose of raising fallen or lodged grain into position where it will pass over the guards, so as to be cut by the sickle.

In the accompanying drawings, Figure 1 represents in plan view a part of the grain-platform, sickle, and guards with the lifting-fingers of the attachment also showing. Fig. 2 is a side elevation of the attachment and guards, the sickle-bar proper and platform-timber being shown in section; and Fig. 3 is a cross-section on the line 3 3 of Fig. 2.

A represents the platform, B the finger-bar, C the sickle, and D the guards, which may be of the usual or any desired construction. The guards are generally about six inches in length and extend in front of the points of the sickle-sections about one-half their length. The platform is usually made adjustable, so that the points of the guards may be set or inclined downward slightly, so as to assist in raising the fallen or lodged grain; but such provision is wholly inadequate when the grain, as frequently occurs, is badly lodged or lies close to the ground, and as a result a considerable portion of a valuable crop is frequently lost. My attachment comprises a series of lifting-fingers E, which may be secured to a common bar F, bolted to the finger-bar B, as shown at *f*. These fingers are preferably light thin castings; but they may be stamped out of sheet metal or even made of wood. They are of such length as to reach with proper curvature almost to the surface of the ground and may be of the cross-section shown in Fig. 3, in which the upper edge is bulbous, as shown at *e*, and the body in the shape of a thin web *e'*, the web gradually diminishing in width toward the point, the extremity of which is preferably rounded on all sides, so as to pass smoothly between and under the stalks of grain. The body of the finger is upwardly curved at its central portion, so as to reach slightly above the extremity or point of the guard. The guards are usually spaced three inches apart in a self-binding harvester, and I have shown the fingers spaced a distance apart equal to about three times the space between the guards.

I have shown the attachment as being rigidly bolted to the finger-bar; but it may be otherwise held in operative relation to said bar. The number of the fingers employed may be varied, and, as before stated, the materials of which they are constructed and the precise form in which they are made may also be varied.

The fingers when constructed of light malleable castings or of sheet metal will have sufficient elasticity or flexibility to permit them to ride over the ground and to pass under the lodged or fallen grain without becoming entangled or broken off, and even if rigid or inelastic may by their form and arrangement be capable of operation under usual conditions, if rigidly bolted to the finger-bar or platform of the machine. Of whatever material or form these fingers may be made they should extend well in front of the guards and close to the ground. Near the points of the guards they rise above the plane of said points, so as to deflect the stalks of grain over the points of the guards. It is to be noted also that the lifting-fingers extend from the highest points of their arched portions obliquely rearwardly and downwardly below the top of the guard, so that the reel whereby the grain is brushed rearwardly may be lowered so as to just clear the guards without encountering the lifting-fingers. This is a feature of importance, for the reason that in tangled grain it usually becomes necessary to lower the reel so that it will barely clear the guards in order to prevent the grain from lodging upon the finger-bar.

With an attachment such as hereinabove described the grain may be raised in position to be cut by the sickle, no matter how badly lodged or fallen, and the several fingers are preferably secured to a common bar or framework to thus constitute an attachment for a harvester which may be readily removed or applied, as occasion may require.

When this attachment is used, the finger-bar itself need not be lowered to the extent heretofore made necessary by fallen or lodged grain, and therefore a higher stubble may be cut, thus avoiding the handling of an unnecessary amount of straw.

I claim—

1. A harvester attachment comprising a series of lifting-fingers each comprising a single curved bar and extending beyond the points of the guards, the lifting portions whereof extend from points above and in front of the points of the guards obliquely downwardly and forwardly while the opposite attached ends extend beneath and below the guards and are connected to the front of the finger-bar, substantially as described.

2. A harvester attachment comprising in combination a series of lifting-fingers and a common bar to which said fingers are attached, said bar being removably secured to the front of the finger-bar beneath the guards thereof and said fingers being rigidly attached thereto and arched upwardly to points above the points of the guards and thence obliquely downward, substantially as described.

3. A lifting-finger for lodged or fallen grain comprising a single curved bar having its inner portion connected to the front of the finger-bar below the upper surface of the guard and its body curved upwardly to lie above the plane of the point of the guard and thence curved downwardly in front of the guard and its extremity being slightly upturned, substantially as described.

4. A harvester attachment comprising a series of lifting-fingers each formed of a single curved bar and extending beyond the points of the guards, the lifting portions whereof extend from points above and in front of the points of the guards obliquely downwardly and forwardly while the opposite attached ends are located below the top of the guards and in front of the finger-bar whereby the grain is lifted above the guards before it passes between the latter and the reel-blades may be carried into close proximity with the tops of the guards without encountering the lifting-fingers, substantially as described.

CHARLES F. CRAVER.

Witnesses:
C. C. LINTHICUM,
L. F. MCCREA.